United States Patent [19]

Baker

[11] Patent Number: 4,616,884
[45] Date of Patent: Oct. 14, 1986

[54] STRUCTURAL BEARINGS
[75] Inventor: John C. Baker, Crewkerne, England
[73] Assignee: AEPLC, England
[21] Appl. No.: 690,764
[22] Filed: Jan. 11, 1985
[30] Foreign Application Priority Data
Jan. 12, 1984 [GB] United Kingdom ............ 8400773
[51] Int. Cl.⁴ ............................................. F16C 29/02
[52] U.S. Cl. ................................................ 384/7; 52/167
[58] Field of Search ............ 308/3 R, 3 C, 4 R; 52/167

[56] References Cited
U.S. PATENT DOCUMENTS
4,187,573  2/1980  Fyfe et al. ............ 308/3 R
4,206,690  6/1980  Eickmann ............. 308/3 C
4,238,137 12/1980  Furchak et al. ....... 308/3 R Primary Examiner—Lenard A. Footland
Attorney, Agent, or Firm—Price, Heneveld, Huizenga & Cooper

[57] ABSTRACT

A structural bearing for example for use in supports for pipelines. The bearing comprises a center plate 21 having a PTFE bearing layer insert 22 and above this a co-operating sliding plate 23 with a stainless steel mating plate 24. The center plate 21 is located with respect to a support 25 by a retaining ring 26. Between the center plate 21 and the support 25 there is a deformable feature 27 which deforms when the bearing is subjected to an uneven load, thereby spreading the load more evenly over the support 25.

6 Claims, 8 Drawing Figures

U.S. Patent   Oct. 14, 1986   Sheet 1 of 2   4,616,884
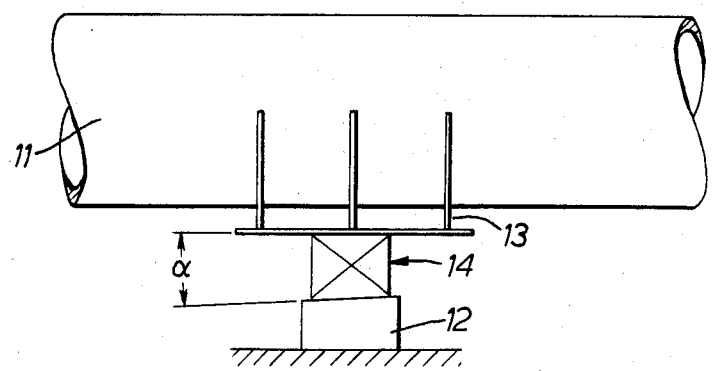
FIG. 1.
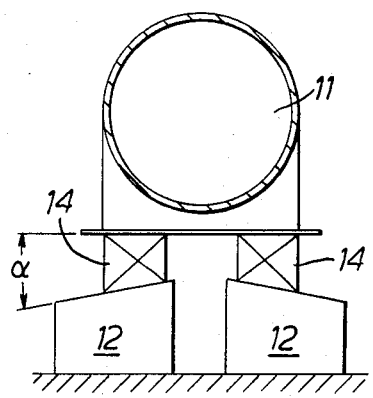  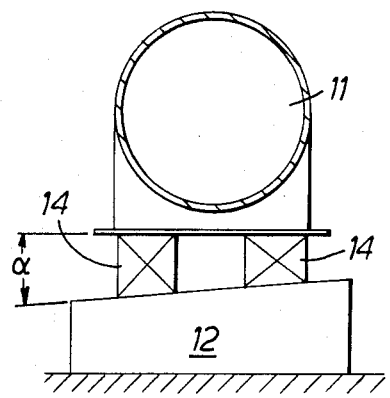
FIG. 2.   FIG. 3.
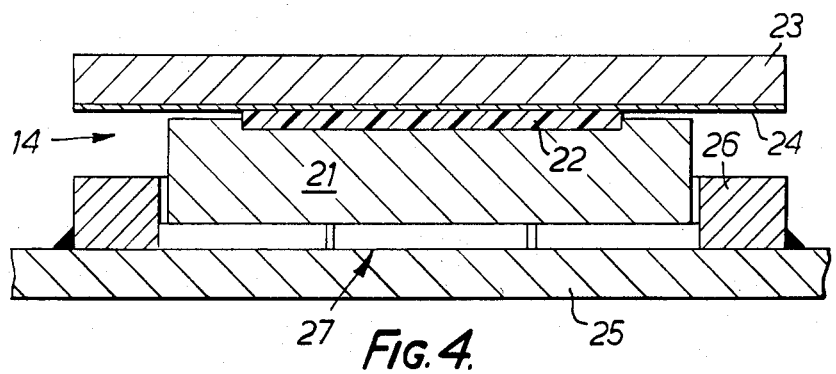
FIG. 4.

STRUCTURAL BEARINGS

BACKGROUND OF THE INVENTION

The present invention relates to structural bearings, that is bearings which are intended to accommodate relatively small movements at low relative velocities but under very great loads. Such movements may be as a result of thermal expansions and contractions in such structures as roofs, bridge supports or pipeline supports.

The present invention is particularly applicable to supports for pipelines, though is useful in other applications.

Pipelines are generally mounted on regularly spaced supports through structural bearings. Frequently, there is a misalignment between the pipe and the support pillar, with the result that the interposed bearing cannot operate effectively even through the pillar may be located accurately at the correct height by survey. Such misalignments may be an axial misalignment in which the pillar is inclined axially with respect to the pipe or a transverse misalignment in which the pillar is inclined tranversely with respect to the pipe or, more frequently, a combination of the two.

SUMMARY OF THE INVENTION

It is an object of the present invention to provide a structural bearing which can accommodate such misalignments and still function effectively.

According to the present invention, a structural bearing comprises a support and a deformable feature which undergoes deformation when the bearing is subjected to an uneven load whereby the load distribution over the support is rendered more even.

Such a bearing may accommodate movements, such as tilting, possibly as a result of vertical loads, without any relative sliding motion. Alternatively, such bearings may accommodate a horziontal or some other form of relative sliding motion. In such a case the bearing preferably includes a support surface and a co-operating surface, one of the surfaces being of a bearing material.

Preferably, the support surface comprises a polytetrafluorethylene surface fixed to a centre plate which is itself preferably located with respect to a support plate. Preferably, the deformable feature is located between the centre plate and the support plate.

Preferably, the co-operating surface is of stainless steel and may form part of a sliding plate. In the case of a pipeline, the sliding plate is preferably fixed to the pipe and the support plate fixed to the support column.

The deformable feature may take a number of different forms, for example a large number of upstanding metal pins, an open or closed cell honeycomb structure, a series of upstanding metal pyramids or cones, or one or more tapering metal rings whose upper diameters are greater than their lower diameters. It may even be possible to use a compartment filled with particulate material whose shape can be changed to accommodate a misalignment by movement of the particles. These can then be set in the desired position by means of an adhesive or cement.

However, the deformable feature preferably comprises a body having an outwardly extending portion and a generally concave region at its base within the outwardly extending portion. Thus, an uneven load on the body can result in deformation of the outwardly extending portion.

Preferably, the outwardly extending portion comprises a flange which may or may not be continuous and may have a downwardly depending lip, thereby defining the concave region. The concave region preferably has a generally convex contour so that it is shallower at the middle than at the outside. The outwardly extending portion preferably forms the lower part of the centre plate and the upper part of the centre plate may have a recess to receive a member which constitutes a sliding surface in the case where the bearing is to accommodate relative sliding.

Thus, in its broadest sense, the deformable feature may comprise a member having an outwardly extending deformable element or elements having a projection or projections in the under surface to provide a clearance space from the underlying member in the unloaded condition, which space is taken up in the loaded condition due to distortion of the deformable element.

The invention may be carried into practice in various ways and some embodiments will now be described by way of example with reference to the accompanying drawings in which:

BRIEF DESCRIPTION OF THE DRAWINGS

FIG. 1 is a vertical axial section through a pipeline showing an axial misalignment;

FIGS. 2 and 3 are vertical transverse sections through a pipeline showing two forms of transverse misalignments;

FIG. 4 is a diagrammatic vertical section through a structural bearing in accordance with the invention.

DESCRIPTION OF THE PREFERRED EMBODIMENTS

Figure 5:
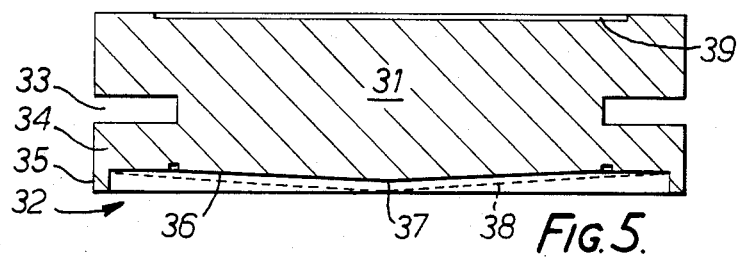
FIG. 5 is a vertical section through one embodiment of a centre plate incorporating a deformable feature.

Referring firstly to FIGS. 1 to 3, a pipeline 11 is mounted on a series of support pillars 12, one of which is shown. The pipe is supported by a cradle 13 welded to the pipe and a structural bearing 14 is then positioned between the cradle 13 and the pillar 12.

In the structure shown in FIG. 2, there are two pillars 12 and two bearings 14, these being spaced transversely of the pipeline. In the structure shown in FIG. 3, there are two transversely spaced bearings 14 on a single pillar 12.

If the surface of the pillar 12 is inclined (as shown) then the bearing 14 must accommodate the angle of misalignment.

One way in which this may be achieved is to use a structural bearing 14 as shown in FIG. 4.

The bearing 14 comprises a mild steel centre plate 21 having the PTFE bearing layer insert 22 and above this, a co-operating sliding plate 23 with a stainless steel mating plate 24 co-operating with the PTFE layer 22.

The centre plate 21 is located with respect to a support plate 25 by means of a retaining ring 26 which is welded to the support plate 25.

Between the centre plate 21 and the support plate 25 there is a deformable feature indicated generally by reference numeral 27.

In use, the support plate 25 would be fixed to a pillar and the sliding plate 23 fixed to the pipeline. Thus, misalignments could be accommodated by a deformation of the deformable feature 27.

FIG. 5 shows a particular form of centre plate 31 which incorporates a deformable feature (indicated generally be reference numeral 32) and which is intended for a bearing accommodating horizontal relative sliding. The centre plate 31 is made of mild steel and is generally circular when viewed from above. It has an annular recess 33 in its outer surface defining an outwardly extending flange 34 at its base. The flange 34 has a downwardly directed lip 35, leaving a cavity 36 in the base of plate 31.

The "roof" of the cavity 36 slopes down radially inwardly towards the centre 37. Thus, when the centre plate 31 is located on a support plate and a load is applied to it from above, the flange 34 deforms, and the centre 37 comes into contact with the support plate.

The purpose of this lower centre 37 is to ensure that at the extent of deformation, the centre plate 31 contacts the support plate at the centre and does not "bottom out" at the sides which would cause high and unequal loading. The broken line 38 shows the position of the roof when the centre plate 31 is under a vertical load, through it will be appreciated that when there is misalignment, this will be accommodated by a corresponding asymetrical deflection or distortion of the flange 34.

The upper surface of the centre plate 31 has a recess 39 to receive a bearing layer insert as shown in FIG. 4.

Figure 6:
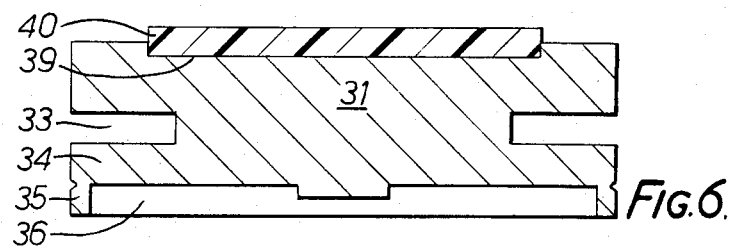
FIG. 6 shows a variation of the plate shown in FIG. 5.

FIG. 6 shows a centre plate 31 which is very similar to that shown if FIG. 5 but in this case the cavity 36 does not slope down to the centre 37. The centre 37 in this case simply comprises a circular shallow boss. The recess 39 includes a pad of ptfe 40.

Figure 7:
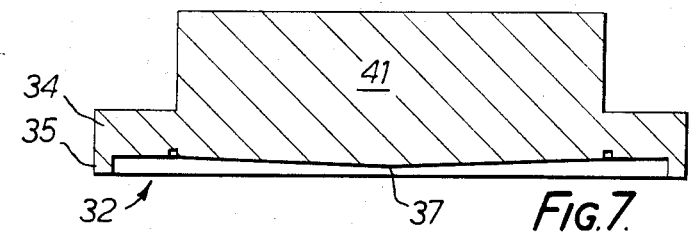
FIG. 7 is a view similar to FIG. 5 of another embodiment.

FIG. 7 shows a centre plate 41 which is intended primarily for a bearing which does not accommodate relative sliding but which incorporates a similar deformable feature 32 to that of FIG. 5. In this case, however, the upper surface of the plate 41 is plain and the flange 34 merely extends outwards from the main body of the plate 41.

Figure 8:
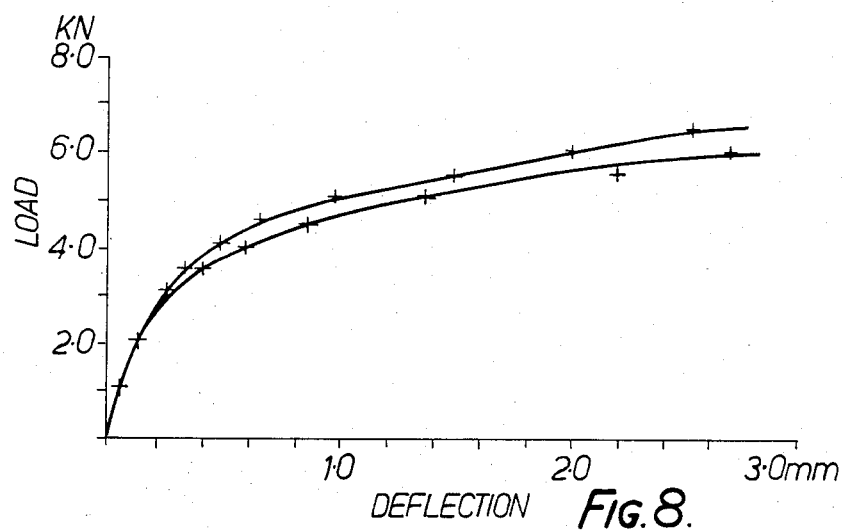
FIG. 8 is a graph of load applied against deflection for a centre plate similar to that of FIGS. 5 or 6.

FIG. 8 is a graph showing the downward deflection of the centre 37 for a given vertical load on two samples similar to that shown in FIG. 5. In the embodiment illustrated, the lip 35 extends away from the flange 34 through 5 mm but the roof slopes down through 2 mm. Therefore, the maximum deflection of the centre 37 would be 3 mm at which point it would contact the underlying support plate.

Although shown in FIGS. 5, 6 and 7 as being circular and continuous, the flange 34 could be any shape and could also be discontinuous. Furthermore, although shown as sloping straight to the centre 37, the roof could curve down towards the middle. Generally only one such centre plate 31, 41 would be employed per bearing though more than one could be used if required.

Obviously, numerous modifications and variations of the present invention are possible on the light of the above teachings. It is therefore to be understood that within the scope of the appended claims, the invention may be practiced otherwise than as specifically described herein.

I claim:

1. A structural bearing adapted to rest on a support surface and capable of deformation comprising a plate having a dependent peripheral support means for engaging the support surface and a load engaging bridge means for extending between and connecting said peripheral support means on opposite sides of the plate, said bridge means including deformation means adjacent said peripheral support means for deforming to permit said bridge to shift its planar relationship to the support surface when said bearing is subjected to a non-uniformly applied load resulting from the spacing between the top surface of the bridge and the support surface being different from one side of the plate to another whereby the load distribution over said support surface is redistributed to render it more uniform.

2. A structural bearing comprising a support, a center plate located above said support, a first bearing surface at the upper surface of said center plate, a sliding plate located above said center plate, and a second bearing surface at the lower surface of said sliding plate, said first and second bearing surfaces being in a cooperating sliding relationship and comprising a stainless steel plate and a ptfe plate, said center plate having at its base an outwardly extending deformable support means for engaging said support and a generally concave recess within said support means, said deformable support means being arranged to undergo deformation when said bearing is subjected to an uneven load whereby the load distribution over said support is rendered more even.

3. A bearing according to claim 2 wherein said outwardly extending support means comprises a flange having a downwardly depending lip thereby defining said concave region.

4. A bearing according to claim 3 wherein said concave region is shallower at the centre than at the outside.

5. A structural bearing adapted to rest on a support surface and capable of deformation as the result of non-uniformly distributed loads, said bearing including a plate having an upper load receiving surface and a lower surface being concave and having depending peripheral portions for engaging the support surface, the depth of said recess being least at the center of said recess, said plate being capable of deformation in response to the non-uniformity of the load distribution applied to its upper surface.

6. The structural bearing described in claim 5 wherein said bearing is of a material which takes a permanent set when it is deformed.

* * * * *